United States Patent [19]

Lemberger

[11] Patent Number: 5,003,947

[45] Date of Patent: Apr. 2, 1991

[54] ARRANGEMENT FOR APPORTIONING THE IDLING AIR OF INTERNAL-COMBUSTION ENGINES

[75] Inventor: Heinz Lemberger, Unterföhring, Fed. Rep. of Germany

[73] Assignee: Bayerische Motoren Werke AG, Fed. Rep. of Germany

[21] Appl. No.: 496,935

[22] Filed: Mar. 21, 1990

[30] Foreign Application Priority Data

Mar. 22, 1989 [DE] Fed. Rep. of Germany ....... 3909396

[51] Int. Cl.$^5$ ............................................. F02M 3/00
[52] U.S. Cl. ...................................... 123/339; 251/65
[58] Field of Search ............................... 123/339, 585; 251/129 H, 75, 77, 65, 129.01, 369

[56] References Cited

U.S. PATENT DOCUMENTS 4,708,110 11/1987 Wietschborke et al. ............ 123/339
4,777,918 10/1988 Yasuoka ............................... 123/339
4,909,213 3/1970 Mazger et al. ....................... 123/339
4,940,031 7/1990 Mann ................................... 123/339

Primary Examiner—R. A. Nelli
Attorney, Agent, or Firm—Evenson, Wands, Edwards, Lenahan & McKeown

[57] ABSTRACT

An arrangement is disclosed for the apportioning if the idling air of internal-combustion engines having an adjustment motor for driving an adjusting member for changing a flow control cross-section and a supplementary device which can be actuated when the internal-combustion engine is rendered inoperative and is used for controlling the adjusting member into a minimum opening of the flow cross-section serving as an emergency cross-section. The supplementary device comprises two magnets arranged to mutually affect one another, one of the magnets being rendered essentially inoperative during the operation of the internal-combustion engine and thus during the operation of the arrangement.

5 Claims, 1 Drawing Sheet

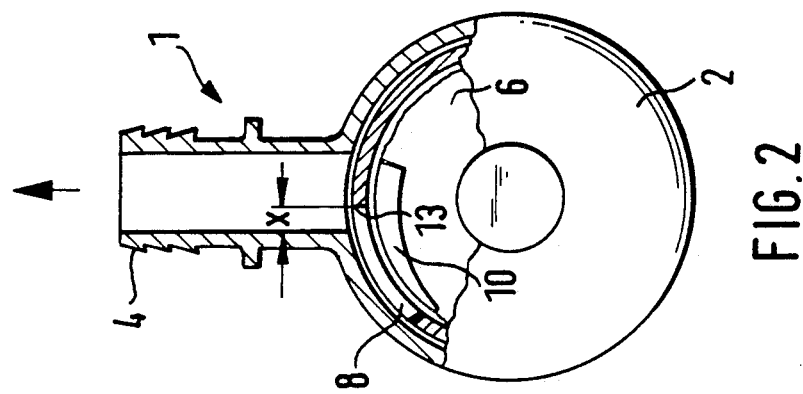
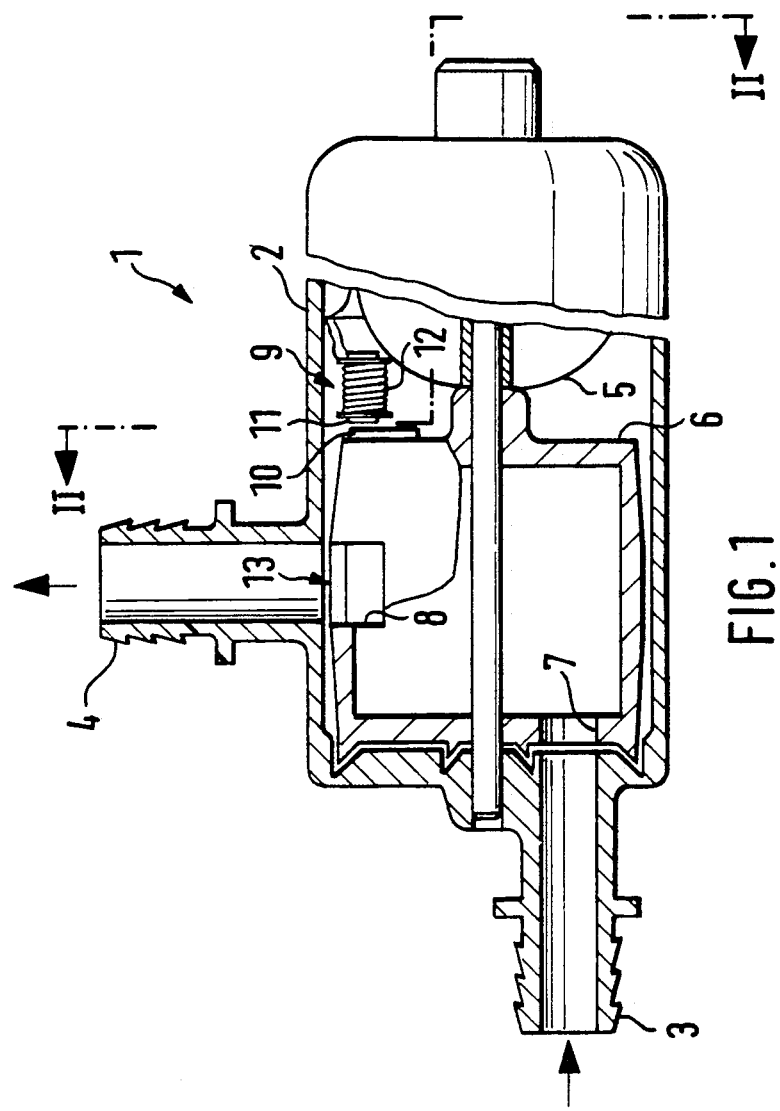

ARRANGEMENT FOR APPORTIONING THE IDLING AIR OF INTERNAL-COMBUSTION ENGINES

BACKGROUND AND SUMMARY OF THE INVENTION

The invention relates to an arrangement for apportioning the idling air of an internal-combustion engine which includes a motor driven air flow adjusting member and a supplementary device for controlling the adjusting member into a minimum opening position when the engine is rendered inoperative.

In the case of internal-combustion engines equipped with "motronics", devices of this type are provided with an electric adjusting motor. Furthermore, in a known construction, this electric adjusting motor acts upon the adjusting member only in the opening direction, whereas, in the closing direction, the adjusting member is acted upon by a spring. Concerning this state of the art, it is stated in German Published Unexamined Patent Application (DE-OS) 32 34 468 that, when the power supply to the electric adjusting motor is interrupted, the adjusting member can be moved into a position by the spring element which ensures a minimum opening of the flow control cross-section. This results in an idling arrangement with an emergency cross-section.

The disadvantage of this known idling arrangement is the fact that an electric winding power (change of resistance) which is a function of the outside temperature must work against a constant spring force. This results in undesirable nonlinearities of the characteristic control line.

The object of the above-mentioned DE-OS 32 34 468 is an idling arrangement with an electric adjusting motor which has a driving effect in the opening and in the closing direction. In this known arrangement, a separate opening for the formation of an emergency cross-section is assigned adjacently to the flow control cross-section to be controlled by the adjusting member. However, in this case, the adjusting member is constructed such that, in a certain position, it covers the flow control cross-section as well as the emergency cross-section and, in this position, the emergency cross-section is made inoperative by means of a mechanical blocking of the adjusting member. The air, which flows in solely by way of leakages of the internal-combustion engine, is not sufficient for a reliable starting.

In both above-mentioned cases, a supplementary device, which can be activated when the internal-combustion engine in rendered inoperative, is used for controlling an emergency cross-section open by means of the adjusting member.

It is an object of the invention to develop an arrangement of the above-mentioned type such that a predetermined emergency cross-section is ensured while the above-mentioned disadvantages are avoided.

This object is achieved according to preferred embodiments of the invention by providing an arrangement wherein the supplementary device comprises two magnets arranged to mutually affect one another, one of the magnets being configured to be rendered essentially inoperative when the internal-combustion engine is operating. By means of the invention, a minimum opening of the flow control cross-section serving as an emergency cross-section is achieved by two magnets arranged to affect one another, in which case one of the magnets arranged at the adjusting member or at a housing for the adjusting member achieves its full effect only when the internal-combustion engine is rendered inoperative. Thus, in every case, when the internal-combustion engine is started, an emergency cross-section is advantageously ensured. During the subsequent operation of the internal-combustion engine and when the idling arrangement is operating, one of the magnets is essentially rendered inoperative so that a control or a linear characteristic curve of the idling arrangement is advantageously not disturbed.

A supplementary device which has a simple construction according to preferred embodiments of the invention utilizes the arrangement of two permanent magnets, in which case one of the permanent magnets is correspondingly combined with an electric coil, for the purpose of a significant weakening of its magnetic field while the idling arrangement is operative. The significant advantage of this supplementary device is the fact that it becomes operative automatically as soon as the internal-combustion engine becomes inoperative for any reason; for example, if the internal-combustion engines dies after a cold start.

Another advantageous development of preferred embodiments provides a supplementary driving device of the adjusting member without any external energy by configuring the uncontrollable permanent magnet with a linear extension which is directed in the same direction as the moving direction of the adjusting member with magnetic fluxes which differ in the opposing end areas, the end area with the lowest magnetic flux, in the case of the largest opening of the flow control cross-section, being adjacent to the area of the effect of the controllable permanent magnet. This results in the additional advantage that, when the idling arrangement is operating defectively, no flow control cross-section is adjusted or controlled that is larger than the predetermined emergency cross-section. A simple design of the uncontrollable permanent magnet for an adjusting member constructed as a rotary slide for this purpose utilizes a crescent shaped permanent magnet.

In certain other contemplated preferred embodiments, the adjusting member is configured as a reciprocating lifting piston.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic partial longitudinal sectional view of an arrangement for the apportioning of idling air, constructed according to a preferred embodiment of the invention; and FIG. 2 is a front view of the arrangement with a cross-sectional view taken along Line II—II in FIG. 1.

DETAILED DESCRIPTION OF THE DRAWINGS

An arrangement 1 for apportioning idle air of an internal-combustion engine which is not shown comprises a housing 2 with an inlet piece 3 and an outlet piece. The arrangement 1 also comprises an electric adjusting motor 5 which is used for driving a drum-shaped adjusting member 6. The adjusting member 6 comprises a control opening 7 which, on the front face, is assigned to the inlet piece 3 as well as an outlet opening 8 assigned to the outlet piece 4 at the drum circumference. For apportioning the respective amount of idle air by way of the control opening 7, the adjusting motor 5 has a driving effect on the adjusting member 6 in both rotating directions. Thus, in the operating state, the adjusting member 6 remains in the position caused by the adjusting motor 5.

In order to ensure a minimum amount of air by way of the arrangement 1 through a so-called emergency cross-section at every start of the internal-combustion engine, also in the case of a currentless adjusting motor, the arrangement 1 has a supplementary device 9 which controls the adjusting member 6 with the control opening 7 and/or the outlet opening 8 into a minimum opening of the flow control cross-section of the inlet piece 3 and/or of the outlet piece 4. According to FIG. 2, the minimum opening used as the emergency cross-section is obtained from the interaction of the flow control cross-section of the outlet piece 4 and the outlet opening 8, in which case a control edge of the outlet opening 4 is spaced away from the interior wall of the outlet piece 4 by the measurement x. The emergency cross-section of the arrangement 1 represented at the outlet piece 4 by the spacing measurement x may, at the same time, exist by way of the control opening 7 controlling the flow control cross-section of the inlet piece so that the advantages exist also which are described in DE-PS 36 33 260 for the drum-type adjusting member 6.

The spacing measurement x which is representative of an emergency cross-section, in the case of a currentless adjusting motor 5, is caused by the supplementary device 9 which comprises two permanent magnets 10 and 11 which are arranged to mutually affect one another. The permanent magnet 10 is arranged on the front face of the adjusting member 6 facing the adjusting motor 5, in the outer circumferential area, and is crescent-shaped. It is preferably made of a sintered material and is poled in such a manner that the front face facing the permanent magnet 11 forms a poling of opposite signs with the permanent magnet. The permanent magnet 11 which may, for example, be rod-shaped, is combined with an electric coil 12. The coil 12 is electrically poled in such a manner that the magnetic field generated by it significantly weakens the magnetic field of the permanent magnet while the arrangement 1 operates perfectly. This results in a control or regulating of the adjusting member 6 by way of the adjusting motor 5 without any interference effect. If, however, the coil 12 becomes currentless, the permanent magnet 11 becomes fully effective and, while interacting with the permanent magnet 10, and causes the positioning of the adjusting member 6 by the distance measurement x of the control edge 13 of the outlet opening 8 from the interior wall of the outlet piece 4.

As described above and as shown in FIG. 2, the uncontrollable permanent magnet 10 on the front face of the adjusting member 6 has the shape of a crescent. It therefore has a linear extension which has the same direction as the moving directions of the adjusting member 6 with different magnetic fluxes in the opposing end areas, the wide end area of the permanent magnet 10 with the large magnetic flux being assigned to the position of the adjusting member 6 which is relevant to the emergency cross-section. Thus, the opposing acute end area of the permanent magnet 10 with the low magnetic flux is assigned to a position of the adjusting member 6 which corresponds to the largest opening of the flow control cross-section. If, in the latter case, the adjusting motor 5 and the coil 9 of the permanent magnet 11 each become currentless, the two permanent magnets 10 and 11 of the supplementary device 9 cause a rotation of the adjusting member 6 in the closing direction until the spacing measurement x is reached which is representative of the emergency cross-section. The supplementary device comprising the magnets 10 and 11, in addition to achieving the positioning for a required emergency cross-section of the arrangement 1, also achieves a driving device for the adjusting member 6 for obtaining the emergency cross-section without any supply of external energy. As a result, in the case of a failure of the adjusting motor 5, it is also ensured that the adjusting member 6 is automatically adjusted until the emergency cross-section is reached, and an uncontrolled revving of the internal-combustion engine as a result of essentially free flow control cross-sections is securely avoided. The supplementary device 9 therefore has a safety function.

The above-described embodiment preferably refers to a rotary adjusting arrangement 1. However, the invention may also be used in so-called lift adjusting arrangements according to other contemplated embodiments.

Other objects, advantages and novel features of the present invention will become apparent from the following detailed description of the invention when considered in conjunction with the accompanying drawings.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for apportioning the idling air of internal-combustion engines, comprising:
   an adjusting motor for driving an adjusting member for changing a flow control cross-section,
   and a supplementary device which can be actuated when the internal-combustion engine is rendered inoperative controlling the adjusting member into a minimum opening (measurement "x") of the flow control cross-section,
   wherein the supplementary device comprises two magnets arranged to mutually affect one another, one of the magnets being configured to be rendered essentially inoperative when the internal-combustion engine is operating.

2. An arrangement according to claim 1, wherein the two magnets are permanent magnets and wherein one of the permanent magnets is combined with an electric coil for the selective significant weakening of its magnetic field.

3. An arrangement according to claim 2, wherein one of the permanent magnets is an uncontrollable permanent magnet having a linear extension which is directed in the same direction as the moving direction of the adjusting member with magnetic fluxes which differ in the opposing end areas, the end area with the lowest magnetic flux, in the case of the largest opening of the flow control cross-section, being adjacent to the area of the effect of the controllable permanent magnet.

4. An arrangement according to claim 3, wherein the uncontrollable permanent magnet is arranged in the circumferential area of an adjusting member constructed as a rotary slide and has a crescent shape.

5. An arrangement according to claim 3, wherein the uncontrollable permanent magnet is arranged at an adjusting member constructed as a reciprocating piston.

* * * * *